March 25, 1941.   J. S. LOSEE   2,236,063
SAMPLING DEVICE
Filed June 19, 1940
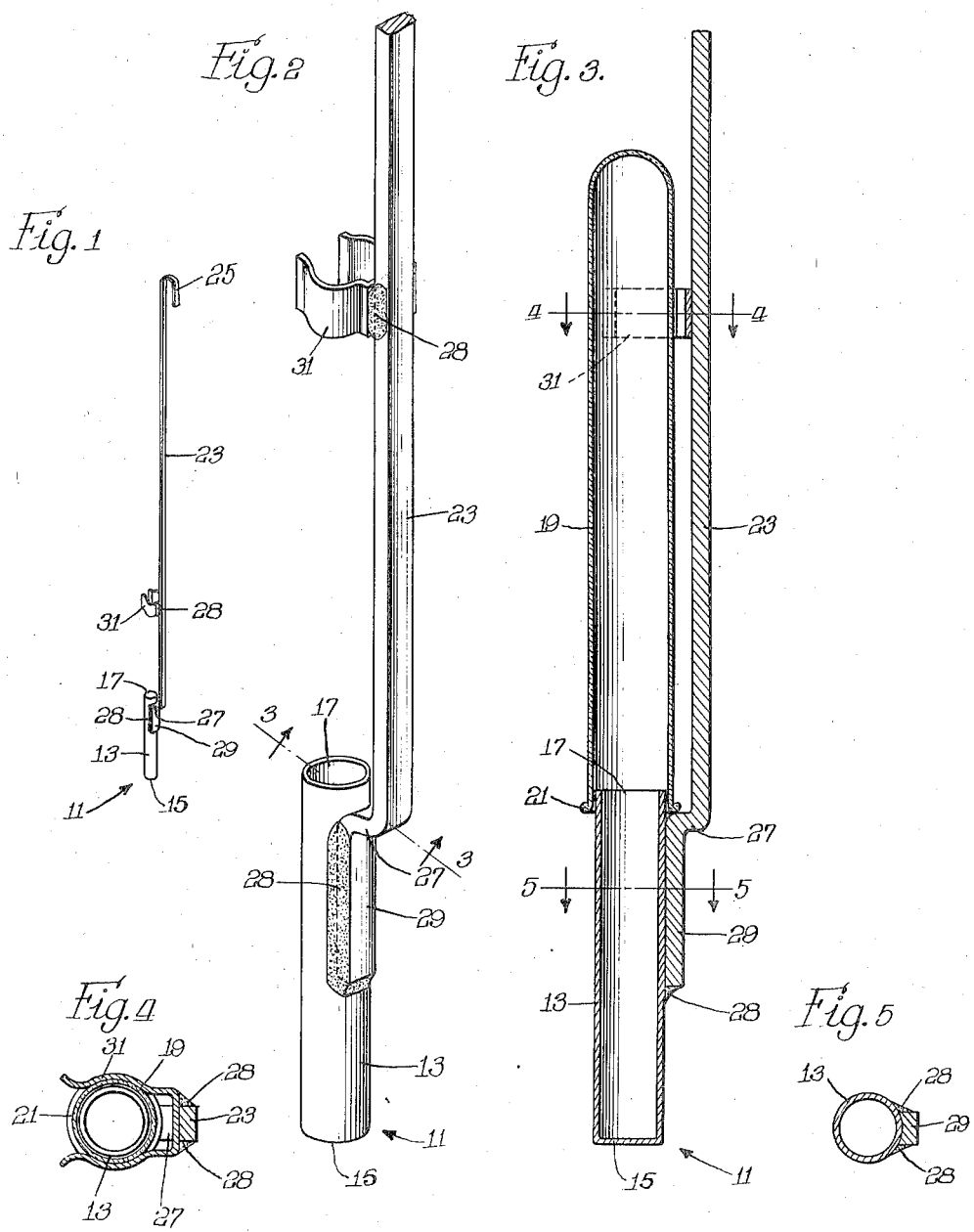
INVENTOR.
Joseph S. Losee
BY Junius F. Cook, Jr.
ATTORNEY.

Patented Mar. 25, 1941

2,236,063

UNITED STATES PATENT OFFICE 2,236,063

SAMPLING DEVICE

Joseph S. Losee, Hebron, Ill.

Application June 19, 1940, Serial No. 341,399

9 Claims. (Cl. 137—18)

My invention relates in general to the sampling of fluids for testing purposes and has more particular reference to the provision of a handy device for sampling milk and like liquids.

An important object of the invention is to provide a simple, inexpensive, readily sterilized dipper for taking samples of liquid such as milk for testing purposes; a further object being to form and arrange the sampler to facilitate transfer of sampled liquid therefrom to a test tube or similar container in which to subject the sample to testing processes.

Another important object is to provide a sampler comprising a container having a mouth sized to fit within the opening of a test tube to facilitate transfer of sampled liquid from the sampling device to the test tube; a further important object being to provide, on the sampling device, means forming a shoulder to determine and limit the extent to which the mouth of the sampling container may be inserted within the test tube in transferring the sampled fluid to the latter.

Another important object is to provide, on the sampling container, aligning means for aiding in the support of a test tube or like testing container on the sampling device during liquid transfer therefrom to the test tube.

Another important object is to provide a sampling device comprising a relatively slender, preferably cylindrical dipper having a mouth sized to fit within the open end of a test tube or like container, and a handle on the dipper in position forming a shoulder adjacent the mouth and forming a stop to limit the insertion of the dipper into the end of the test tube, the handle also forming steadying means for aiding in retaining a test tube on the sampling device during transfer therefrom of a test sample into the test tube.

These and numerous other important objects, advantages, and inherent functions of the invention will be more fully understood from the following description, which, taken in connection with the accompanying drawing, discloses a preferred embodiment of the invention.

Referring to the drawing:

Figure 1 is a perspective view of a sampling device embodying my present invention;

Figure 2 is an enlarged perspective view of a portion of the device shown in Figure 1;

Figure 3 is a sectional view taken substantially along the line 3—3 in Figure 2;

Figure 4 is a sectional view taken substantially along the line 4—4 in Figure 3; and Figure 5 is a sectional view taken substantially along the line 5—5 in Figure 3.

To illustrate the invention, I have shown on the drawing a sampling device 11 particularly well adapted for use in sampling milk for test purposes. Milk is ordinarily tested at the receiving stations at which raw milk is delivered, usually in large cans, by the producer. Testing is accomplished by obtaining a sample from each can as it is delivered, the samples being immediately subjected to tests before the contents of the can are dumped into a common receiving tank.

Under the circumstances, the sampling and testing necessarily have to be accomplished rapidly in order not to delay the delivery of milk by successive producers who may be waiting in line to deliver their loads at the receiving station.

To aid, facilitate and expedite the sampling of milk in cans, and to facilitate the transfer of milk samples to milk testing equipment, I have provided a sampler of slender configuration well suited for insertion through the relatively restricted top opening of a milk can in order to obtain a milk sample, the device also being useable to stir the contents of the can prior to the taking of a sample. To this end, the sampler 11 comprises a preferably cylindrical container 13 having a closed bottom 15 and an open top 17, said top being of a size to fit readily within the open end of a standard test tube 19 of the sort used as a testing receptacle, such tube ordinarily comprising a cylindrical glass member closed at one end and open at the other, the opening being defined by a beaded edge 21. The cylindrical container 13 preferably is of a size to contain exactly the quantity of milk required for testing purposes and is formed with an elongated handle 23 preferably comprising a rectangular bar curled at one end to form a hook 25, and connected at the other end on the side of the container 13, the hook serving as means for hanging the sampling device either on the top of a milk can or on a hook when not in use. The container connected end of the handle 23 is offset, as at 27, to form a portion 29 which may be fastened in any suitable preferred or convenient manner to the side of the container 13, the portion 29 being secured on the container in position such that the offset portion 27 forms a shoulder spaced behind and facing toward the open end of the container.

By grasping the handle 23 and inserting the container 13 into the open top of a milk can, the container 13 may first be used to stir up the milk in the can and then to take a milk sample by submerging the container in the liquid to be sampled. Upon withdrawing the sampling device, the receptacle 13 will contain the exact quantity required in performing the milk testing operation. Thereupon the test tube 19 may be applied on the sampling device in the manner shown in Figure 3 of the drawing by placing the open end of the test tube around the open end 17 of the container 13 with the beaded edge 21 of the test tube resting upon the shoulder defined by the handle portion 27, thereby limiting the movement of the open end of the container 13 into the test tube. The test tube extends along and adjacent the handle 23 and may be held in place manually while the sampler is inverted to discharge its contents into the open end of the test tube, which may then be removed from the sampling device merely by dropping it on the handle sufficiently to disengage the open end of the test tube from the open end of the container 13.

In order to aid in retaining the test tube in mounted position on the sampler during the transfer of liquid from the container 13 into the test tube, I prefer to form the handle 23 with means for holding the test tube in place and, to this end, have shown holding means 31 forming a seat for receiving the closed end of the test tube and holding the same in place when the tube is mounted on the sampler in position to receive sampled liquid therefrom. In the illustrated embodiment, the holding means 31 comprises a preferably sheet metal clip mounted on the handle 23 and providing a pair of spaced-apart arms extending from the handle in position to embrace the opposite sides of the test tube when the same is in mounted position on the sampling device. This clip 31 need not necessarily grip the test tube but may operate purely as a guide to aid in the positioning of the test tube on the sampling device, the hand of the operator serving to retain the test tube in position on the handle. However, if desired, the clip 31 may be formed with resilient arms for the purpose of yieldingly gripping the sides of the test tube in order to retain the same in place.

The container 13, the handle 23 and the guide means 31 are preferably formed of non-corroding metal, the parts being secured together by solder fillets 28 or by welding, soldering, brazing or other preferred fastening method; and it will be seen that the sampling device is of extremely simple, inexpensive character and is easily maintained in hygienic condition by sterilization.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A sampling device comprising means forming a handle, a container on said handle having an opening defined by a rim, and means on said container forming a shoulder on said rim spaced from and facing in the direction of said opening, whereby to support a test tube on the device in position with the open end of the test tube embracing said rim and resting on said shoulder.

2. A sampling device comprising means forming an elongated handle, a container on the end of said handle having an opening facing toward the opposite end of the handle, said opening being defined by a rim, and means forming a shoulder on said rim spaced from and facing in the direction of said opening, whereby to support a test tube on the device in position with the open end of the test tube embracing said rim and resting on said shoulder.

3. A sampling device comprising means forming an elongated handle, a container on the end of said handle having an opening facing toward the opposite end of the handle, said opening being defined by a rim, and means forming a shoulder on said rim spaced from and facing in the direction of said opening, said handle forming a test tube support whereby a test tube may be mounted on the device in position with the open end of the test tube embracing said rim and resting on said shoulder and the body of the test tube engaging the handle at a point remote from said opening.

4. A sampling device comprising means forming an elongated handle, a container on the end of said handle having an opening facing toward the opposite end of the handle, said opening being defined by a rim, means forming a shoulder on said rim spaced from and facing in the direction of said opening, and guide means on said handle in position spaced from said opening to receive and support a test tube on the device in position with the open end of the test tube embracing said rim and resting on said shoulder.

5. A sampling device comprising means forming an elongated handle, a container on the end of said handle having an opening facing toward the opposite end of the handle, said opening being defined by a rim, means forming a shoulder on said rim spaced from and facing in the direction of said opening, and guide means on said handle in position spaced from said opening to receive and support a test tube on the device in position with the open end of the test tube embracing said rim and resting on said shoulder, said guide means comprising means forming spaced arms on said handle in position to embrace the opposite sides of the body of the test tube.

6. A sampling device comprising means forming an elongated handle, a container on the end of said handle having an opening facing toward the opposite end of the handle, said opening being defined by a rim, means forming a shoulder on said rim spaced from and facing in the direction of said opening, and guide means on said handle in position spaced from said opening to receive and support a test tube on the device in position with the open end of the test tube embracing said rim and resting on said shoulder, said guide means comprising a clip having resilient arms adapted to yieldingly engage the opposite sides of the body of the test tube.

7. A sampling device comprising an elongated metal strip forming a handle, and a cylindrical metal container, open at one end and closed at the other, secured on one end of said handle in position with the open end of the container facing the opposite end of said handle, the container attached end of said handle forming a shoulder spaced from and facing toward the open end of the container to form a stop for supporting a test tube on the device in position with the open end of the test tube embracing the open end of the container and resting on said stop.

8. A sampling device comprising an elongated metal strip forming a handle, and a cylindrical metal container, open at one end and closed at the other, secured on one end of said handle in position with the open end of the container facing the opposite end of said handle, the container attached end of said handle forming a shoulder spaced from and facing toward the open end of the container to form a stop for supporting a test tube on the device in position with the open end of the test tube embracing the open end of the container and resting on said stop, said handle forming means extending adjacent a test tube so positioned for the purpose of supporting the test tube in place on the device.

9. A sampling device comprising an elongated metal strip forming a handle, a cylindrical metal container, open at one end and closed at the other, secured on one end of said handle in position with the open end of the container facing the opposite end of said handle, the container attached end of said handle forming a shoulder spaced from and facing toward the open end of the container to form a stop for supporting a test tube on the device in position with the open end of the test tube embracing the open end of the container and resting on said stop, and means on said handle spaced from the open end of said container and forming a seat for receiving and supporting the body of a test tube.

JOSEPH S. LOSEE.